US011913106B2

(12) United States Patent
Laheurte et al.

(10) Patent No.: US 11,913,106 B2
(45) Date of Patent: Feb. 27, 2024

(54) METASTABLE ß TITANIUM ALLOY, TIMEPIECE SPRING MADE FROM SUCH AN ALLOY AND METHOD FOR PRODUCTION THEREOF

(71) Applicant: SAS INNO TECH CONSEILS, Maîche (FR)

(72) Inventors: Pascal Laheurte, Forbach (FR); Pierre Charbonnier, Metz (FR); Laurent Peltier, Nouilly (FR)

(73) Assignee: SAS INNO TECH CONSEILS, Maîche (FR)

( * ) Notice: Subject to any disclaimer, the term of this patent is extended or adjusted under 35 U.S.C. 154(b) by 456 days.

(21) Appl. No.: 16/497,327

(22) PCT Filed: Mar. 14, 2018

(86) PCT No.: PCT/EP2018/056440
§ 371 (c)(1),
(2) Date: Sep. 24, 2019

(87) PCT Pub. No.: WO2018/172164
PCT Pub. Date: Sep. 27, 2018

(65) Prior Publication Data

US 2020/0308685 A1 Oct. 1, 2020

(30) Foreign Application Priority Data

Mar. 24, 2017 (FR) ...................................... 1752503

(51) Int. Cl.
*C22F 1/18* (2006.01)
*C22C 14/00* (2006.01)
*G04B 17/06* (2006.01)

(52) U.S. Cl.
CPC .............. *C22F 1/183* (2013.01); *C22C 14/00* (2013.01); *G04B 17/066* (2013.01)

(58) Field of Classification Search
CPC . C22F 1/183; C22F 1/18; C22C 14/00; C21D 2211/001; G04B 17/066; G04B 17/06; G04B 17/34; B21F 3/08
(Continued)

(56) References Cited

U.S. PATENT DOCUMENTS 7,837,812 B2 11/2010 Marquardt et al.
9,464,344 B2 10/2016 Laheurte et al.

FOREIGN PATENT DOCUMENTS

CN 1699610 A 11/2005
CN 101760669 A 6/2010
(Continued)

OTHER PUBLICATIONS

Moffat and Larbalestier, "The Competition between the Alpha and Omega Phases in Aged Ti—Nb Alloys", Metallurgical Transactions A, vol. 19A, Jul. 1988, p. 1687-1694 (Year: 1988).*
(Continued)

*Primary Examiner* — Brian D Walck
*Assistant Examiner* — Danielle Carda
(74) *Attorney, Agent, or Firm* — Greer, Burns & Crain, Ltd

(57) ABSTRACT

A metastable β titanium alloy is provided, which includes, by weight percent, between 24 and 45% niobium, between 0 and 20% zirconium, between 0 and 10% tantalum and/or between 0 and 1.5% silicon and/or less than 2% oxygen, said alloy having a crystallographic structure containing:
- a mix of austenitic phase and alpha phase; and
- a presence of omega phase precipitates the volume fraction of which is less than 10%. Also provided is a timepiece spring made from such an alloy and a method for producing such a spring.

18 Claims, 3 Drawing Sheets

(58) Field of Classification Search
USPC .......................................................... 148/670
See application file for complete search history.

(56) References Cited

FOREIGN PATENT DOCUMENTS

| | | | |
|---|---|---|---|
| EA | 1063 | B1 | 10/2000 |
| EP | 1593004 | A2 | 11/2005 |
| EP | 3009153 | A1 | 4/2016 |
| JP | 2006089825 | A | 4/2006 |
| JP | 2013170304 | A | 9/2013 |
| RU | 2095455 | C1 | 11/1997 |
| RU | 2485197 | C1 | 6/2013 |
| WO | 2005064033 | A3 | 7/2005 |
| WO | 2015189278 | A2 | 12/2015 |

OTHER PUBLICATIONS

Nag et al., "Intra-granular alpha precipitation in Ti—Nb—Zr—Ta biomedical alloys", J Mater Sci (2009) 44:808-815, DOI: 10.1007/s10853-008-3148-2 (Year: 2008).*

Yamamoto et al., "X-ray Fluorescence Holography for a Ti—Nb Binary Alloy Consisting of the Martensite, Austenite and Omega Phase", Z. Phys. Chem. 2016; 230(4): 509-517, DOI: 10.1515/zpch-2015-0670 (Year: 2016).*

Gabrion et al., "Effect of a hyper deformation drawing process on mechanical behaviour of thin wires of Ti-26Nb (at.%) alloys", available online Feb. 14, 2017, Materials and Design 120 (2017) p. 273-279 http://dx.doi.org/10.1016/j.matdes.2017.02.036 (Year: 2017).*

Cremasco, A., Ferreira, I., & Caram, R. (2010). Effect of Heat Treatments on Mechanical Properties and Fatigue Resistance of Ti-35Nb Alloy Used as Biomaterial. Materials Science Forum, 636-637, 68-75. https://doi.org/10.4028/www.scientific.net/msf.636-637.68 (Year: 2010).*

Sun et al., A thermo-mechanical treatment to improve the superelastic performances of biomedical Ti-26Nb and Ti-20Nb-6Zr (at.%) alloys, Journal of the mechanical behavior of biomedical materials, vol. 4 (2011) 1864-1872 (Year: 2011).*

S.J. Li et al., Fatigue properties of a metastable ß-type titanium alloy with reversible phase transformation, Acta Biomaterialia 4 (2008) p. 305-317 (Year: 2008).*

French Search Report and Written Opinion from the corresponding French Patent Application No. 1752503, dated Oct. 18, 2017.

International Search Report and Written Opinion from the corresponding International Patent Application No. PCT/ EP2018/056440, dated May 15, 2018.

Cremasco et al., "Correlations between aging heat treatment, phase precipitation and mechanical properties of a cast Ti—Nb alloy", Materials & Design, Nov. 11, 2010, pp. 2387-2390, vol. 32, Elsevier Ltd.

Elmay et al., "Improvement of Superelastic Performance of Ti—Nb Binary Alloys for Biomedical Applications", Journal of Materials Engineering and Performance, Jul. 2014, pp. 2471-2476, vol. 23(7), ASM International.

Kim et al., "Effect of thermo-mechanical treatment on mechanical properties and shape memory behavior of Ti-(26-28) at .% Nb alloys", Materials Science and Engineering A, 2006, pp. 839-843, Elsevier B.V.

Brailovski et al., Bulk and porous metastable beta Ti—Nb—Zr(Ta) alloys for biomedical applications, Materials Science and Engineering C, 31 (2011), pp. 643-657.

* cited by examiner

METASTABLE ß TITANIUM ALLOY, TIMEPIECE SPRING MADE FROM SUCH AN ALLOY AND METHOD FOR PRODUCTION THEREOF

BACKGROUND

The present invention relates to a metastable β titanium alloy and use thereof as a timepiece spring.

The invention also relates to a method for implementing a timepiece spring produced based on a metastable β titanium alloy.

The invention relates, among other things, to a specific use of the metastable β titanium alloy as a hairspring and as a mainspring.

The materials used in the manufacture of timepiece springs are essential elements of mechanical watches and require specific properties varying according to the function of the spring.

The balance-wheel and hairspring combination is the element governing the watch; it delivers a torque by oscillating about a balance position with a natural frequency. So that the watch goes out of adjustment as little as possible, it is necessary for the hairspring to deliver a torque that is as constant as possible and have a natural frequency that varies as little as possible. The hairspring is characterized by the restoring torque thereof, which is directly proportional to the limit of elasticity of the hairspring.

As a result, for improvement in the performance of the hairspring it is necessary to limit the impact of the torque drift and natural frequency factors. These factors are mainly linked to the effect of physical environmental factors, in particular the temperature and the magnetic field. Moreover, the effects of expansion and variation in the mechanical properties under the effect of temperature and the effects of magnetostriction of a metallic material under the effect of a magnetic field alter the mechanical characteristics of the hairspring.

The barrel-mainspring combination is the element intended to supply energy to the watch. In order to supply the greatest possible constant quantity of energy, the mainspring must have a torque that is as constant as possible and be capable of storing the greatest possible quantity of potentially restorable energy. The mainspring is characterized by the elastic potential thereof, which is directly proportional to the limit of elasticity and to the elastic modulus of the mainspring.

As a result, apart from the required properties for the hairsprings, improvement in the performance of the mainsprings relies on the use of materials that have the highest possible limit of elasticity.

Another essential criterion is that of the method of production of such springs. In fact, the springs must have the smallest possible size, and are therefore the subject of advanced miniaturization during their forming. The method used for forming such miniaturization must not be accompanied either by a reduction in the mechanical properties of the material, or an irregularity with respect to the size of the piece, or a reduction in the quality of the surface condition of the piece.

With respect to hairsprings, nickel-iron based alloys are known from the prior art, also known to a person skilled in the art as "Elinvar" alloys. This type of alloy remains today mainly used for the manufacture of hairsprings: in particular alloys of this type, sold under the trade names of Nivarox and Nispan, are used. Other alloys of the same type are also used having similar compositions and sold under the trade names of Metalinvar and Isoval. One of the main limitations of such alloys is associated with the fact that they have a high sensitivity to magnetic fields. As a result, the torque and the natural frequency of timepiece springs based on such materials may drift significantly in the presence of magnetic disturbance.

With respect to mainsprings, cobalt-nickel-chrome based alloys are known from the prior art, including one of the most widespread commercial alloys being known as Nivaflex. This type of alloy proves to have a relatively high elastic modulus. In fact, the working reserve of such springs is moderate.

Standard forming methods using titanium-based alloys are also known in the state of the art. Nevertheless, taking account of the mechanical and tribological properties of such alloys, their forming and in particular their miniaturization, is extremely difficult and limited.

An aim of the invention is to propose:

- a metastable β titanium alloy and a method for forming a timepiece spring based on such an alloy making it possible to overcome the aforementioned drawbacks at least partially, and/or
- an alloy having a super-elastic behaviour, and/or
- an alloy having a low Young's modulus, and/or
- an alloy having a negligible magnetic susceptibility, and/or
- an alloy the elastic modulus of which has a negligible sensitivity to temperature variations.

SUMMARY

To this end, according to a first aspect of the invention, a metastable β titanium alloy is proposed comprising, as a percentage by weight, between 24and 45% niobium, between 0 and 20% zirconium, between 0 and 10% tantalum, and/or between 0 and 1.5% silicon and/or less than 2% oxygen.

According to the invention, the metastable β titanium alloy has a crystallographic structure comprising:

- a mixture of austenitic phase and alpha phase, and
- a presence of omega-phase precipitates the volumetric concentration of which is less than 10%.

According to the invention, the metastable β titanium alloy can consist, as a percentage by weight, of between 24 and 45% niobium, between 0 and 20% zirconium, between 0 and 10% tantalum and/or between 0 and 1.5% silicon and/or less than 2% oxygen, this alloy having a crystallographic structure comprising:

- a mixture of austenitic phase and alpha phase, and
- a presence of omega-phase precipitates the volumetric concentration of which is less than 10%.

In the remainder of the description, the term "alloy" used alone will be used to denote the metastable β titanium alloy according to the invention.

The boundaries of the percentage by weight ranges of the elements of the alloy are inclusive in said ranges.

The alloy can comprise one or more elements from hydrogen, molybdenum and vanadium.

The alloy can comprise one or more elements from manganese, iron, chromium, nickel and copper.

The alloy can comprise tin.

The alloy can comprise one or more elements from aluminium, carbon and nitrogen.

The alloy can comprise one or more elements from hydrogen, molybdenum, vanadium, manganese, iron, chromium, nickel, copper, tin, aluminium, carbon and nitrogen.

The alloy can comprise less than 10%, preferably less than 8%, more preferably less than 6%, even more preferably less than 5%, yet more preferably less than 3% of (a) non-metallic element(s).

Advantageously, the alloy comprises only titanium and niobium.

Advantageously, the alloy comprises titanium and between 35 and 45% niobium.

Advantageously, the alloy comprises titanium and 40.5% niobium.

The presence of austenitic phase in the alloy confers super-elastic properties on said alloy. The austenitic phase is also denoted beta phase by a person skilled in the art.

The super-elastic properties comprise a consistent recoverable deformation and a high limit of elasticity.

The presence of alpha phase in the alloy makes it possible to harden said alloy.

The presence of omega phase in the alloy makes it possible to harden said alloy.

The mixture of austenitic phase and alpha phase allows the alloy to have a low elastic modulus and negligible sensitivity of the elastic modulus to temperature variations.

The presence of omega-phase precipitates within the alloy does not affect the mechanical properties of the alloy when it is below a threshold quantity.

The quantity of omega-phase precipitates within the alloy must be less than a threshold value of 10% so that the alloy retains a low elastic modulus.

The volumetric concentration of the omega-phase precipitates can be less than 5%, preferably than 2%, more preferably than 1%.

Additionally, the metastable β titanium alloy of which 50% or more, preferably 60% or more, more preferably 70% or more, even more preferably 80% or more and yet more preferably 90% or more as a percentage by weight, can consist of 24 to 45% niobium, and 0 to 20% zirconium, and/or 0 to 10% tantalum, and/or 0 to 1.5% silicon, and/or less than 2% oxygen, and the metastable β titanium alloy has a crystallographic structure comprising:

- a mixture of austenitic phase and alpha phase, and
- a presence of omega-phase precipitates the volumetric concentration of which is less than 10%.

The metastable β titanium alloy can consist of titanium and niobium, and/or zirconium and/or tantalum, and/or silicon and/or oxygen.

The metastable β titanium alloy can consist of titanium and niobium.

The alpha phase of the alloy can have a volumetric concentration comprised between 1 and 40%, preferably between 2 and 35%, preferably between 5 and 30%.

The presence of an alpha-phase volumetric concentration comprised between 5 and 30% allows the alloy to have optimal mechanical properties.

The presence of an alpha-phase volumetric concentration comprised between 1 and 40% makes it possible to retain a relatively low elastic modulus.

Advantageously, the alpha phase and the omega phase are present in the form of precipitates within a matrix constituted by austenitic grains.

The presence of the alpha-phase precipitates within a matrix constituted by austenitic grains makes it possible to harden the alloy.

The presence of the omega-phase precipitates is necessary in order to initiate the appearance of the alpha-phase precipitates.

A grain size of the alloy can be less than 1 μm.

The alloy comprising the grains of size less than 1 μm has an increased elastic deformation limit.

The grains of the alloy can preferably be equiaxed.

Advantageously, the grain size of the alloy is less than 500 nm.

The grain size of the alloy of less than 500 nm makes it possible to improve the limit of elasticity of the alloy.

The alloy can comprise:

- an alpha-phase precipitates size less than 500 nm, and
- an omega-phase precipitates size less than 100 nm.

Advantageously, the alpha-phase precipitates size is less than 300 nm, preferably less than 200 nm, more preferably less than 150 nm.

Advantageously, the omega-phase precipitates size is less than 50 nm, preferably less than 30 nm.

The initial presence of omega phase within the beta matrix allows better distribution of said alpha-phase precipitates among the austenitic grains.

The better distribution of the alpha-phase precipitates within the austenitic grains makes it possible to improve the mechanical properties of the alloy.

The omega and/or alpha phase has a crystalline structure different from the austenitic phase.

The alpha phase makes it possible to harden the material and thus to increase the mechanical strength of the alloy.

The alloy has a constant elastic modulus over a temperature range comprised between −10° C. and 55° C.

The alloy has a negligible magnetic susceptibility.

The alloy has a Young's modulus less than 80 GPa (GigaPascal) over a temperature range comprised between −70° C. and 210° C.

The alloy has a maximum breaking strength of 1500 MPa and a reversible deformation greater than or equal to 2% for temperatures below 55° C.

According to a second aspect of the invention, a timepiece spring is proposed, produced from metastable β titanium alloy according to the first aspect of the invention.

In the remainder of the description, the term "spring" used alone will be used to denote the timepiece spring according to the invention.

By spring torque is meant a restoring torque of the spring.

The super-elastic properties of the alloy confer on the spring a more constant torque.

The negligible magnetic susceptibility of the alloy allows the torque and the natural frequency of the spring to remain constant when the alloy is exposed to neighbouring magnetic fields.

The negligible sensitivity of the alloy to temperature allows the torque of the spring to remain constant within a temperature range comprised between −10° C. and 55° C.

The low Young's modulus and the low mass density of the alloy make it possible for the spring to have a potentially restorable elastic energy greater than those of the alloys currently in use.

According to an embodiment of the second aspect of the invention, the spring is a hairspring.

According to another embodiment of the second aspect of the invention, the spring is a mainspring.

According to a third aspect of the invention, a balance-wheel and hairspring combination is proposed comprising:

- the hairspring according to the second aspect of the invention,
- a balance-wheel of metastable β titanium alloy according to the first aspect of the invention.

According to a fourth aspect of the invention, a spring-barrel combination is proposed comprising:

- the mainspring according to the second aspect of the invention,
- a barrel of metastable β titanium alloy according to the first aspect of the invention.

According to a fifth aspect of the invention, a method is proposed for the production of a timepiece spring according to the second aspect of the invention, said method comprising:

- work hardening of the alloy at a work-hardening rate greater than or equal to 50%,
- forming the spring based on the work-hardened alloy,
- heat treatment of the formed alloy at a temperature comprised between 300° C. and 600° C. during a time comprised between 2 and 30 min.

According to the invention, the work-hardening step comprises:

- introducing the alloy into a tooling used for work hardening said alloy, said alloy having a temperature of less than 500° C. when it is introduced into the tooling used for the work hardening,
- heating the tooling used for work hardening said alloy at a temperature comprised between 150° C. and 500° C.

Advantageously, the work-hardening rate is greater than or equal to 100%.

Advantageously, the heat treatment of the formed alloy is implemented at a temperature comprised between 350° C. and 550° C.

Advantageously, the heat treatment of the formed alloy is implemented during a period comprised between 5 and 20 min.

Advantageously, the tooling used for work hardening said alloy is heated at a temperature comprised between 200° C. and 450° C.

Advantageously, the alloy is introduced into the tooling used for work hardening said alloy at a temperature less than 450° C.

Advantageously, the alloy is introduced into the tooling used for work hardening said alloy at a temperature comprised between 250° C. and 400° C.

The work-hardening step can be iterated at least twice before the forming step.

The rate of work-hardening the alloy can reduce from one iteration to another.

The iteration of the work-hardening step can be defined as the passage of the alloy through the tool used for work hardening said alloy several times successively.

The iteration of the work-hardening step can be defined as the passage of the alloy through the tool used for work hardening said alloy several times consecutively.

The temperature range for work hardening according to the method, comprised between 150° C. and 500° C., makes it possible to reduce the forces on passing the alloy through the tool.

The inventors discovered that the temperature range for work hardening according to the method, comprised between 150° C. and 500° C., makes it possible to avoid generalized precipitation of phases while still retaining effective work hardening.

The inventors discovered that implementing the work hardening at a temperature range comprised between 150° C. and 500° C. makes it possible to accelerate the precipitation of the alpha and omega phases during the step of heat treatment following the work hardening.

A person skilled in the art knows to introduce the material to be work hardened hot into the tooling used for work hardening the material, said tooling being cold when the material is introduced.

The inventors discovered that (i) when the alloy has a temperature of less than 500° C. when it is introduced into the tooling used for the work hardening and (ii) the tooling is heated, there is a substantial reduction in fracture of the alloy during the work-hardening step.

The inventors discovered that (i) when the alloy has a temperature of less than 500° C. when it is introduced into the tooling used for the work hardening and (ii) the tooling is heated, it is possible to increase the rate of work-hardening of the alloy substantially.

The temperature range, comprised between 300° C. and 600° C., used during the heat treatment step, allows recrystallization of the very small-size alpha-phase grains, typically the size of recrystallized alpha-phase grains can be less than 500 nm, preferably less than 300 nm.

The temperature range, comprised (i) between 300° C. and 600° C., preferably (ii) between 350° C. et 550° C., used during the heat treatment step, makes it possible to obtain a recrystallized alpha-phase grain size (i) less than 200 nm, (ii) less than 150 nm.

The heat treatment also allows precipitation of an alpha phase in the form of alpha grain within a matrix constituted by austenitic grains.

The precipitation of the alpha phase during the heat treatment is initiated by the presence of omega phase.

The combined parameters of implementation of the steps (i) of work hardening and (ii) of heat treatment allow a minimal presence of omega phase grains.

The combined parameters of implementation of the steps (i) of work hardening and (ii) of heat treatment allow a presence of alpha-phase grains in an optimal proportion.

The combined parameters of implementation of the steps (i) of work hardening and (ii) of heat treatment allow optimal distribution of the alpha-phase grains and of the omega phase grains within the matrix of austenitic grains.

The combined parameters of implementation of the steps (i) of work hardening and (ii) of heat treatment allow optimal grain sizes to be obtained.

The combination of the hyper-deformation and of the heat treatment of the alloy make it possible to improve the breaking strength and the reversible deformation of the alloy.

Forming the spring can comprise:

- cold rolling of the alloy at a rate of reduction of a cross section of the alloy less than or equal to 50%,
- coiling of said rolled alloy,
- heat treatment at a temperature comprised between 300° C. and 900° C.

The rate of reduction of the cross section of the alloy can be comprised between 8 and 25%.

The heat treatment carried out in the context of the forming step has the effect, among others, of setting the shape of the spring.

The temperature of the heat treatment can be comprised between 300° C. and 600° C., preferably between 350° C. and 500° C.

The method can comprise a step of preparation for work hardening, the step of preparation for work hardening comprising:

- heating the alloy to a deposition temperature,
- graphite-based deposition on a surface of the alloy,
- drying the alloy at a temperature comprised between 100° C. and 500° C.

Advantageously, the step of drying the alloy is implemented at a temperature comprised between 250° C. and 400° C.

A person skilled in the art knows to lubricate a material to be work hardened by means of a liquid lubricant, said lubricant being entrained by said material to be work hardened into the tool used for the work hardening of said material to be work hardened.

The preparation step allows the alloy, during the work hardening, to withstand pressures exerted by the tool used in order to work harden the alloy, which are greater than those it would withstand if work hardened according to the work hardening methods known to a person skilled in the art.

The step of preparation for work hardening can be additional to the step known to a person skilled in the art of lubrication of the tool used for work hardening a material.

The step of preparation for work hardening can be substituted for the step known to a person skilled in the art of lubrication of the tool used for work hardening a material.

The step of preparation for work hardening makes it possible to substantially improve the surface condition of the alloy obtained after work hardening.

The temperature of deposition can be comprised between 100° C. and 500° C.

Advantageously, the temperature of deposition is comprised between 250° C. and 400° C.

The deposition of graphite can be carried out in liquid phase.

The deposition of graphite can be carried out by:

- dipping the alloy in an aqueous solution comprising graphite in suspension, or
- flow coating, or spraying, of said aqueous solution on said alloy.

The deposition can also be carried out by a vacuum deposition process, such as, among others, vapour-phase chemical deposition or vapour-phase physical deposition.

According to the invention, the work hardening can be implemented by wire drawing.

The temperature range, comprised between 150° C. and 500° C., used during the wire drawing makes it possible to form the alloy into the form of small-diameter wires, typically having diameters less than 100 μm, considerably limiting the risks of breaking of the wires.

According to the invention, the successive passes of a wire through a die are preferably always carried out in the same direction.

The method of producing the spring makes it possible to obtain regularity and accuracy to within one micrometre, as well as a surface condition compatible with horological applications.

According to a sixth aspect of the invention, a method for work hardening a material is proposed comprising:

- introducing the material into a tooling used for work hardening said material, said material having a temperature of less than 500° C. when it is introduced into the tooling used for the work hardening,
- heating the tooling used for work hardening said material to a temperature greater than 250° C.

The material to be work hardened can be an alloy.

Advantageously, the material is introduced into the tooling used for work hardening the material at a temperature less than 350° C.

Advantageously, the material is introduced into the tooling used for work hardening the material at a temperature less than 150° C.

Advantageously, the material is introduced into the tooling used for work hardening the material at ambient temperature.

By ambient temperature is meant a temperature of an environment in which the method is carried out.

Advantageously, the material is introduced into the tooling used for work hardening the material in the absence of a step of heating the material beforehand.

The work hardening method can comprise a step of preparation for work hardening, the step of preparation for work hardening comprising:

- heating the material to a deposition temperature,
- deposition of graphite on a surface of the material,
- drying the material at a drying temperature greater than 100° C.

Advantageously, the drying temperature is greater than 250° C.

The temperature of deposition can be greater than 100° C.

Advantageously, the deposition temperature is greater than 250° C.

The deposition of graphite can be carried out in liquid phase.

The deposition of graphite can be carried out by:

- dipping the material in a solution comprising graphite in suspension, or
- flow coating, or spraying, of said solution on said material.

The deposition can also be carried out by a vacuum deposition process, such as, among others, vapour-phase chemical deposition or vapour-phase physical deposition.

BRIEF DESCRIPTION OF THE DRAWINGS

Other advantages and features of the invention will become apparent on reading the detailed description of embodiments and modes of realization which are in no way limitative, and from the following drawings.

DETAILED DESCRIPTION

Figure 1:
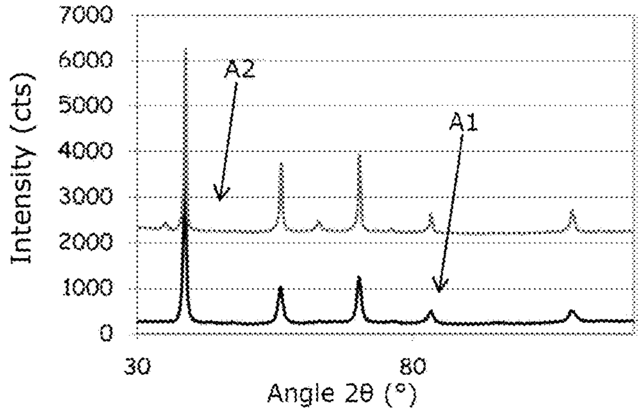
FIG. 1 shows a diffractogram of an alloy A1 according to the invention having undergone a step of wire drawing E1 according to the invention and a diffractogram of an alloy A2 corresponding to the alloy A1 having undergone a step of heat treatment T1 according to the invention.

As the embodiments described hereinafter are in no way limitative, variants of the invention can be considered comprising only a selection of the characteristics described, in isolation from the other characteristics described (even if this selection is isolated within a phrase comprising these other characteristics), if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

An embodiment of a timepiece spring according to the invention is now described. The timepiece spring is obtained from a wire of 2 to 3 mm diameter made from metastable β titanium alloy comprising 40.5% niobium as a percentage by weight.

The method for the production of the spring comprises heating the wire to a temperature of 350° C., followed by dipping the wire in an aqueous solution comprising graphite in suspension. The wire is then dried at a temperature of 400° C. for 5 to 30 seconds. The wire is then drawn through a tungsten carbide or diamond die at a temperature of 400° C. The wire is introduced into the die without being heated. The wire is passed through the die several times. The deformation applied reduces progressively from one pass to another and varies from 25 to 8% in variation of the cross section of the wire. When the cross section of the wire is comprised between 2 and 1 mm, the rate of reduction of the cross section of the wire is 15% per pass, when the cross section of the wire is comprised between 1 and 0.5 mm, the rate of reduction of the cross section of the wire is 10% per pass and when the cross section of the wire is less than 0.5 mm, the rate of reduction of the cross section of the wire is 8% per pass. The wire is always drawn in the same direction. The set of steps described above constitute the wire drawing step E1 and the alloy according to the embodiment having undergone the step E1 is denoted A1.

The wire is then cold rolled; the reduction in the cross section applied is 10% so as to obtain a resilient metal ribbon having a rectangular cross section.

The ribbon is then wound on a mandrel so as to form an Archimedes spiral comprising 15 turns.

The ribbon is then immobilized, then heat treated at a temperature of 475° C. for 600 seconds. The heat treatment step constitutes the step denoted T1. The alloy A2 corresponds to the alloy A1 having subsequently undergone the step T1.

With reference to FIG. 1, the diffractograms A1 and A2 show the effect of the heat treatment step T1 on the crystalline structure of the alloy according to the invention. The diffractogram A1 shows only the peaks characteristic of the β (austenitic) phase. After the step T1, the diffractogram of A2 shows the peaks characteristic of the β and α phases. The significant width of the base of the peaks indicates the presence of considerable work hardening of the alloy.

The inventors noted an optimum temperature range, comprised between 200 et 450° C., for work hardening of the alloy A1 for which there is (i) absence of generalized precipitation of phases and (ii) effective work hardening of the alloy.

The inventors also noted an optimum volumetric concentration range of alpha phase of the alloy A1. This range corresponds to an alpha-phase volumetric concentration comprised between 5 and 30%, making it possible, after implementation of steps E1 and T1, (i) to obtain superelastic properties, (ii) to increase the mechanical strength of the alloy, (iii) to have a low elastic modulus and (iv) to obtain negligible sensitivity of the elastic modulus to temperature variations.

Figure 2:
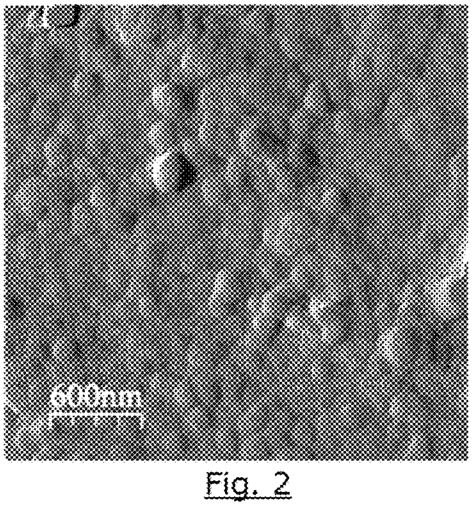
FIG. 2 shows an image of the alloy A2 obtained by atomic force microscopy (AFM)

With reference to FIG. 2, an AFM image can be seen of the microstructure of an alloy wire A2 of 285 μm diameter. FIG. 2 shows the presence of recrystallized equiaxed grains the size of which is comprised between 150 and 200 nm. The inventors noted that when heat treatment is carried out under the conditions described above, i.e. at moderate temperatures and for a short time, it allows recrystallization of grains of very small diameters, typically of grains less than 150 nm.

Figure 4:
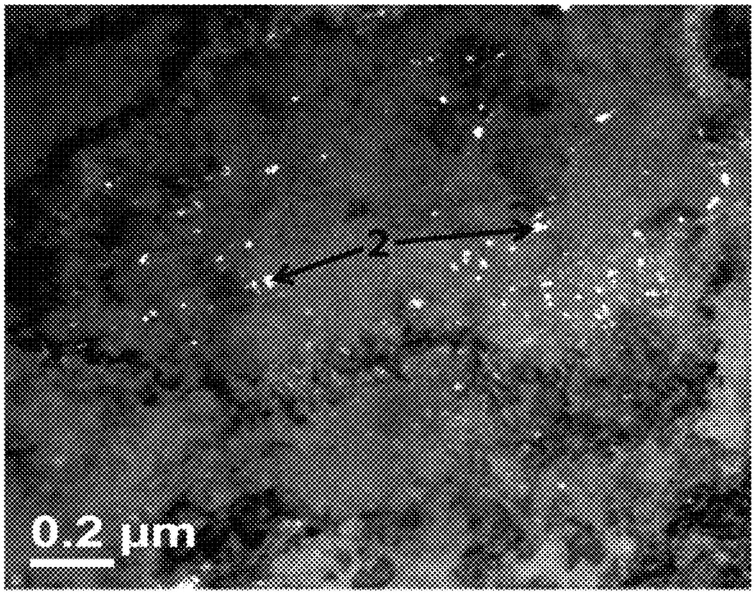
FIGS. 3, 4 and 5 show images of the alloy A2 obtained by transmission electron microscopy (TEM) and X-ray diffraction.
Figure 3:
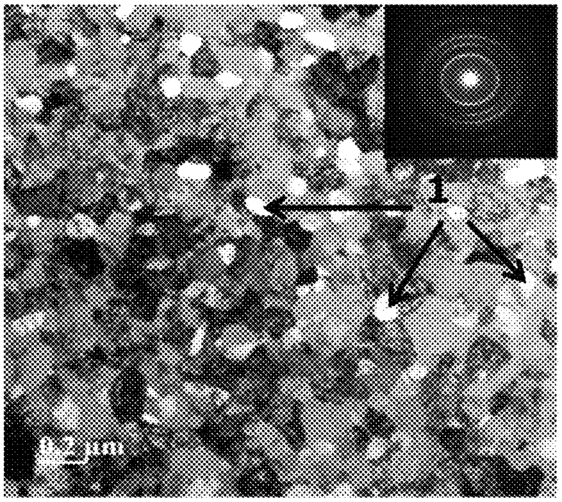
Figure 5:
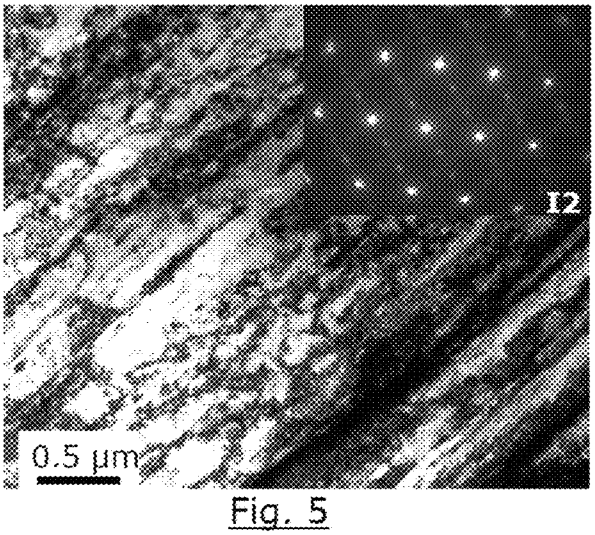

With reference to FIGS. 3, 4 and 5, MET images are shown of the microstructure of an alloy wire A2, of 285 μm diameter. FIG. 3 shows the presence of grains 1 of an alpha phase within a matrix of grains of beta phase. These alpha-phase grains 1 are present in the form of equiaxed grains of 100 to 200 nm within β-phase grains. Under the conditions of the method according to the invention, the alpha-phase grains 1 are few and distributed homogeneously among the β-phase grains. The inventors noted that the heat treatment allows precipitation of an alpha phase and homogeneous germination of the alpha phase within the β-phase precipitates. These alpha-phase grains 1 have an average size less than 150 nm. An electronic diffraction diagram of the selected area is shown in the insert I1 situated at the top right in FIG. 3. It can be seen that the diffraction of the beta-phase grains tends to form rings, indicating a randomization of the crystallographic orientations of the beta-phase grains. This randomization of crystallographic orientations of the beta-phase grains confirms a recrystallization induced by the step T1.

FIG. 4 confirms the presence of omega-phase grains 2 within the matrix of beta-phase grains. These omega-phase grains 2 have an average size less than 50 nm. Under the conditions of the method according to the invention, the omega-phase grains, which are deleterious for the mechanical properties of the alloy but necessary in order to initiate the precipitation of the alpha-phase grains, (i) are dispersed within the beta-phase grains, (ii) have a low volumetric concentration, typically less than 5% and (iii) have a low average grain size.

FIG. 5 confirms the joint presence of the alpha, beta and omega phases within the alloy A2. An electronic diffraction diagram of the selected area is shown in the insert I1 situated at the top right in FIG. 3. The diffractogram indicates the presence of alpha- and omega-phase grains within the matrix of beta-phase grains.

The inventors noted that the precipitation of the alpha-phase grains is initiated by the presence of the omega-phase grains.

In addition, the precipitation of omega and alpha phase during the step T1 is accelerated by the prior step of work hardening during warm wire drawing in the step E1.

Figure 6:
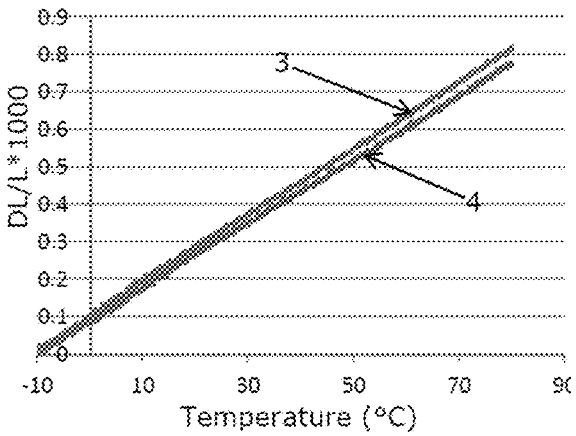
FIG. 6 shows the linear expansion coefficient of the alloy A2 and of an alloy sold under the trade name of Nispan C, mainly used for the manufacture of hairsprings.

With reference to FIG. 6, the evolution of the linear expansion coefficients of the alloy A2 and of an alloy sold under the trade name of Nispan are shown. The curve 3 shows the evolution of the expansion of the alloy A2 as a function of temperature and the curve 4 shows the evolution of the expansion coefficient of Nispan as a function of temperature. The value of the linear expansion coefficient is $9.10^{-6}$ for the alloy A2 and $8.10^{-6}$ for Nispan. The value of the expansion coefficient of a material reflects the influence of temperature on the dimensions of the spring by the effects of contraction and expansion of the material. The value of the expansion coefficient of a material thus reflects the influence of temperature on the mechanical properties of the spring and therefore the influence of temperature on the torque delivered by a spring composed of this material. It is noted here that the coefficient of the alloy A2 is low, and identical to that of Nispan.

Figure 7:
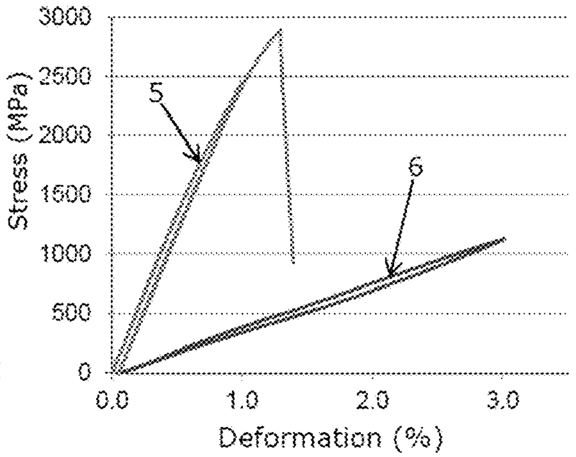
FIG. 7 shows the stress-strain curves of an alloy, sold under the trade name of Nivaflex, mainly used for the manufacture of mainsprings, and of the alloy A2.

With reference to FIG. 7, the stress-strain curves 5, 6 are shown of an alloy sold under the trade name of Nivaflex, 5 and of the alloy A2, 6. The breaking strength is 1000 MPa for the alloy A2 and 2000 MPa for the Nivaflex; the elastic modulus is 40 GPa for the alloy A2 and 270 GPa for the Nivaflex, and the recoverable deformation is 3% for the alloy A2 and 0.7% for the Nivaflex. The area below the stress-strain curve on release allows the potentially restorable elastic energy to be calculated, this elastic energy being 10 Kj/mm$^3$ for the Nivaflex and 16 Kj/mm$^3$ for the alloy A2. This characteristic indicates that a mainspring made from the alloy A2 allows a greater quantity of energy to be stored than the mainsprings made from Nivaflex.

Figure 8:
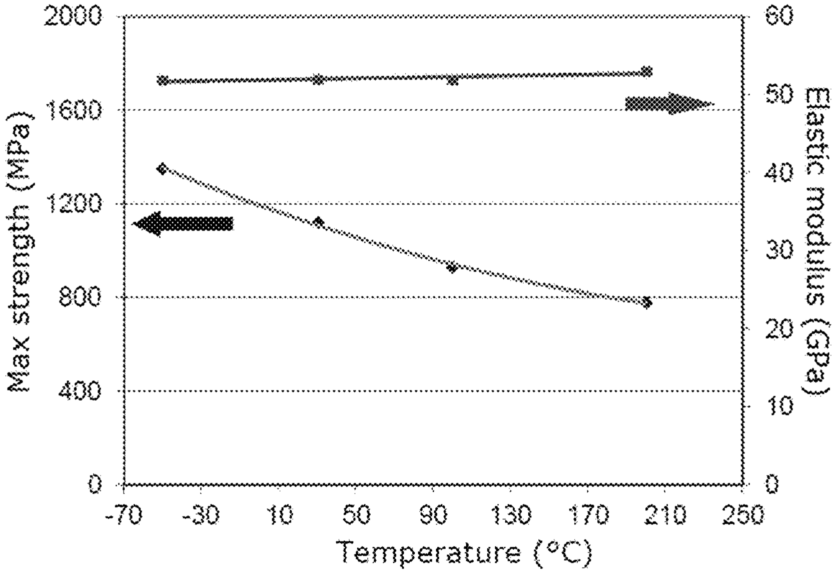
FIG. 8 shows the elastic modulus and the breaking strength as a function of temperature of the alloy A2.

With reference to FIG. 8, the elastic modulus and the elastic strength of the alloy A2 are shown as a function of temperature. The elastic modulus is almost constant between 200 and −50° C., reducing by a value of 54 GPa for a temperature of 200° C. to a value of 53 GPa for a temperature of −50° C. This characteristic indicates that the torque of a spring made from alloy A2 has high stability over a temperature range comprised between 200 and −50° C. The breaking strength increases by a value of approximately 800 MPa for a temperature of 200° C. to a value of 1350 MPa for a temperature of −50° C.

Figure 9:
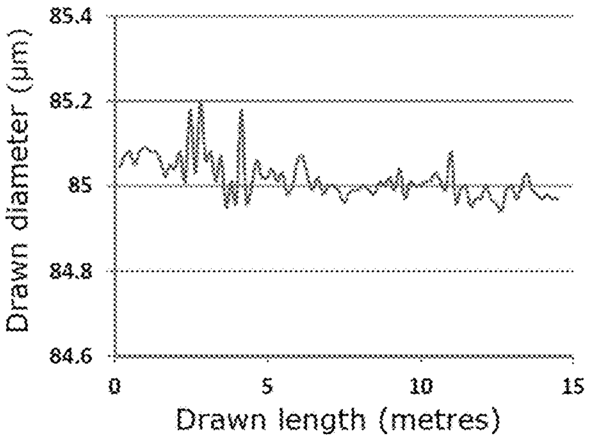
FIG. 9 shows the diameter of a wire made from alloy A2, obtained by the method E1 according to the invention, as a function of the drawn length.

With reference to FIG. 9, the evolution of the diameter of the alloy wire A2 is shown as a function of the length of the drawn wire. It is noted that for a wire having a final diameter of 85 microns and a drawn length of 15 m, the maximum variation in the diameter over the entire length of the wire is comprised between 0.1 and 0.2 μm.

The regularity and the surface condition of the wires obtained by the wire drawing method according to the invention are compatible with the expected requirements for horological applications.

Figure 10:
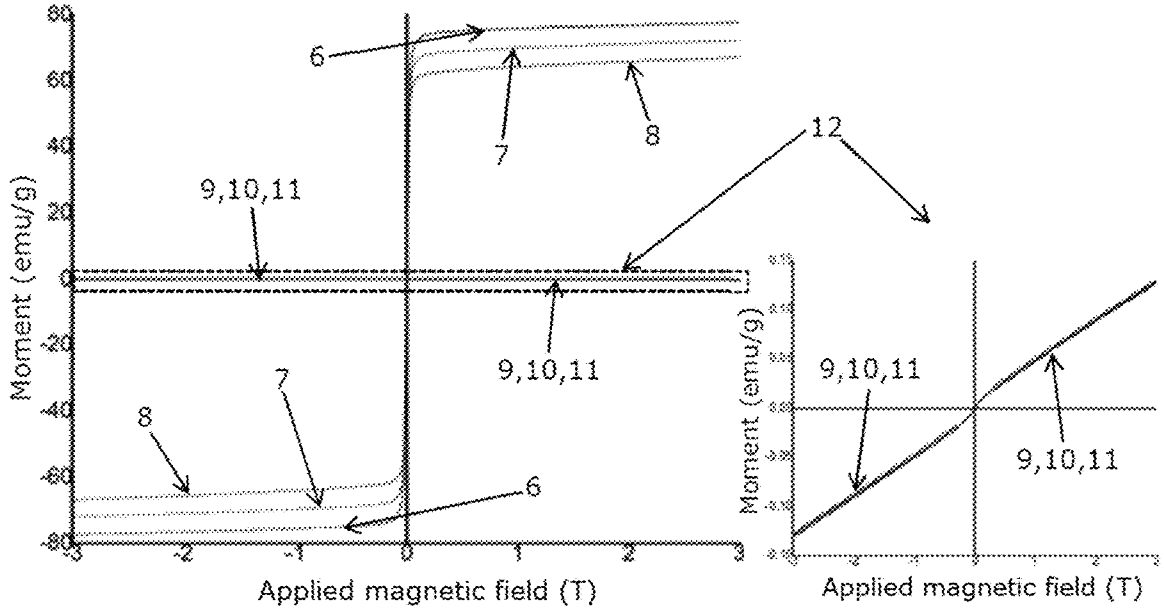
FIG. 10 shows magnetometric measurements carried out on the alloy Nispan C and on the alloy A2.

With reference to FIG. 10, the evolution of the induced moment is shown as a function of the applied magnetic field, for temperatures of −10° C. (references 6 and 9), 20° C. (references 7 and 10) and 45° C. (references 9 and 11), for Nispan 6, 7, 8 and alloy A2 9, 10, 11. As a result of the negligible value of the induced moment in the alloy A2, an enlargement 12 of the curves 9, 10, 11 is given. It is also noted that despite the enlargement 12, the curves 9, 10, 11 remain superimposed. For Nispan, the induced moment saturates from 550 mT and shows values comprised between 60 and 80 emu/g, depending on temperature. As a comparison, for the alloy A2, the induced moment in the material for an applied magnetic field of 3 T is approximately 0.15 emu/g. At 550 mT, the induced moment in the alloy A2 is 1000 times less than the induced moment in Nispan.

The main drawback of the commercial alloys currently used for producing timepiece springs arises from the sensitivity of these alloys to the neighbouring magnetic fields. This sensitivity introduces a perpetual, cumulative drift in the torque of the spring. The very low magnetic susceptibility of the alloy A2 makes it possible to increase significantly the constancy of the torque of the timepiece springs made from alloy according to the invention, as the effect on said springs of the neighbouring magnetic fields is infinitesimal.

Of course, the invention is not limited to the examples which have just been described, and numerous adjustments can be made to these examples without exceeding the scope of the invention.

In addition, the different characteristics, forms, variants and embodiments of the invention can be combined together in various combinations provided they are not incompatible or mutually exclusive.

The invention claimed is:

1. A metastable β titanium alloy comprising as a percentage by weight, between 24 and 45% niobium, between 0 and 20% zirconium, between 0 and 10% tantalum and/or between 0 and 1.5% silicon and/or less than 2% oxygen, the alloy having a crystallographic structure comprising:

a mixture of austenitic phase and alpha phase; and the presence of omega-phase precipitates the volumetric concentration of which is greater than 0% and less than 10%, and said alloy alpha phase has a volumetric concentration comprised between 1 and 40%, and each grain of the alloy having a grain size that is less than 1 μm.

2. The alloy according to claim 1, characterized in that the alpha phase and the omega phase are present in the form of precipitates within a matrix constituted by austenitic grains.

3. The alloy according to claim 1, wherein:

an alpha-phase precipitates size is less than 500 nm; and an omega-phase precipitates size is less than 100 nm.

4. A timepiece spring produced from metastable β titanium alloy, said metastable β titanium alloy comprising, as a percentage by weight, between 24 and 45% niobium, between 0 and 20% zirconium, between 0 and 10% tantalum and/or between 0 and 1.5% silicon and/or less than 2% oxygen, said alloy having a crystallographic structure comprising:

a mixture of austenitic phase and alpha phase; and a presence of omega-phase precipitates the volumetric concentration of which is greater than 0% and less than 10%, and said alloy alpha phase has a volumetric concentration comprised between 1 and 40%, and each grain of the alloy having a grain size that is less than 1 μm.

5. The timepiece spring of claim 4 produced from metastable β titanium alloy wherein the alpha phase and the omega phase are present in the form of precipitates within a matrix constituted by austenitic grains.

6. The timepiece spring according to claim 4, in which the spring is a hairspring.

7. The timepiece spring according to claim 4, in which the spring is a mainspring.

8. A balance-wheel and hairspring combination comprising:

the hairspring according to claim 6, a balance-wheel made from metastable β titanium alloy, said metastable β titanium alloy comprising, as a percentage by weight, between 24 and 45% niobium, between 0 and 20% zirconium, between 0 and 10% tantalum and/or between 0 and 1.5% silicon and/or less than 2% oxygen, said alloy having a crystallographic structure comprising:

a mixture of austenitic phase and alpha phase; and a presence of omega-phase precipitates the volumetric concentration of which is less than 10%.

9. The balance-wheel and hairspring combination according to claim 8, in which the metastable β titanium alloy is characterized in that the alpha phase has a volumetric concentration comprised between 1 and 40%.

10. The balance-wheel and hairspring combination of claim 8 comprising:

the hairspring produced from metastable β titanium alloy, said metastable β titanium alloy comprising, as a percentage by weight, between 24 and 45% niobium, between 0 and 20% zirconium, between 0 and 10% tantalum and/or between 0 and 1.5% silicon and/or less than 2% oxygen, said alloy having a crystallographic structure comprising:

a mixture of austenitic phase and alpha phase;

a presence of omega-phase precipitates the volumetric concentration of which is less than 10%; and a balance-wheel made from metastable β titanium alloy wherein the alpha phase and the omega phase are present in the form of precipitates within a matrix constituted by austenitic grains.

11. spring-barrel combination comprising:

the mainspring according to claim 7;

a barrel made from metastable β titanium alloy, said metastable β titanium alloy comprising, as a percentage by weight, between 24 and 45% niobium, between 0 and 20% zirconium, between 0 and 10% tantalum and/or between 0 and 1.5% silicon and/or less than 2% oxygen, said alloy having a crystallographic structure comprising:

a mixture of austenitic phase and alpha phase; and a presence of omega-phase precipitates the volumetric concentration of which is less than 10%.

12. The spring-barrel combination according to claim 11, in which the metastable β titanium alloy is characterized in that the alpha phase has a volumetric concentration comprised between 1 and 40%.

13. The spring-barrel combination of claim 11 comprising:

the mainspring produced from metastable β titanium alloy, said metastable β titanium alloy comprising, as a percentage by weight, between 24 and 45% niobium, between 0 and 20% zirconium, between 0 and 10% tantalum and/or between 0 and 1.5% silicon and/or less than 2% oxygen, said alloy having a crystallographic structure comprising:

a mixture of austenitic phase and alpha phase;

a presence of omega-phase precipitates the volumetric concentration of which is less than 10%; and a barrel made from metastable β titanium alloy wherein the alpha phase and the omega phase are present in the form of precipitates within a matrix constituted by austenitic grains.

14. A method for the manufacture of a timepiece spring according to claim 4, said method comprising:

work hardening of the alloy at a work-hardening rate greater than or equal to 50%;

forming the spring based on the work-hardened alloy; and heat treatment of the formed alloy at a temperature comprised between 300° C. and 600° C. during a time comprised between 2 and 30 min;

said work-hardening step comprises:

introducing the alloy into a tooling used for work hardening said alloy, said alloy having a temperature of less than 500° C. when it is introduced into the tooling used for the work hardening; and heating the tooling used for work hardening said alloy at a temperature comprised between 150° C. and 500° C.

15. The method according to claim 14, in which forming the spring comprises:

cold rolling of the alloy at a rate of reduction of a cross section of the alloy less than or equal to 50%;

coiling of said rolled alloy; and heat treatment at a temperature comprised between 300° C. and 900° C.

16. The method according to claim 14, comprising a step of preparation for work hardening, said step of preparation for work hardening comprising:

heating the alloy to a deposition temperature;

graphite-based deposition on a surface of said alloy; and drying said alloy at a temperature comprised between 100° C. and 500° C.

17. The method according to claim 16, in which the temperature of deposition is comprised between 100° C. and 500° C.

18. The method according to claim 14, in which the work hardening is implemented by wire drawing.

* * * * *